(12) United States Patent
Hawksworth et al.

(10) Patent No.: US 12,442,440 B2
(45) Date of Patent: Oct. 14, 2025

(54) GEAR SYSTEM

(71) Applicant: Goodrich Actuation Systems Limited, Wolverhampton (GB)

(72) Inventors: Andrew Robert Hawksworth, Newport (GB); Saranjit Kular, Wolverhampton (GB)

(73) Assignee: GOODRICH ACTUATION SYSTEMS LIMITED, Wolverhampton (GB)

( * ) Notice: Subject to any disclaimer, the term of this patent is extended or adjusted under 35 U.S.C. 154(b) by 0 days.

(21) Appl. No.: 18/621,391

(22) Filed: Mar. 29, 2024

(65) Prior Publication Data
US 2024/0337312 A1    Oct. 10, 2024

(30) Foreign Application Priority Data
Apr. 5, 2023 (EP) .................................... 23275057

(51) Int. Cl.
*F16H 49/00*    (2006.01)

(52) U.S. Cl.
CPC ..... *F16H 49/001* (2013.01); *F16H 2049/003* (2013.01)

(58) Field of Classification Search
CPC .............................. F16H 49/001; F16C 19/08
See application file for complete search history.

(56) References Cited

U.S. PATENT DOCUMENTS

| | | | |
|---|---|---|---|
| 3,187,605 A * | 6/1965 | Bernard | F16H 49/001 74/640 |
| 4,909,098 A | 3/1990 | Kiryu | |
| 9,021,919 B2 * | 5/2015 | Takahashi | F16H 49/001 74/640 |

(Continued)

FOREIGN PATENT DOCUMENTS

| | | | |
|---|---|---|---|
| DE | 102018117122 A1 * | 3/2019 | F16H 1/32 |
| DE | 102021109838 A1 | 10/2022 | |

(Continued)

OTHER PUBLICATIONS

Machine Translation of DE-102018117122-A1 (Year: 2019).*

(Continued)

*Primary Examiner* — Jake Cook
(74) *Attorney, Agent, or Firm* — CANTOR COLBURN LLP

(57) ABSTRACT

A strain wave gear system includes a circular spline arranged around a longitudinal axis, a flexible spline within and coaxial with the circular spline and a wave generator within and coaxial with the flexible spline. The wave generator is non-circular in a plane perpendicular to the longitudinal axis. The flexible spline is arranged to flex in response to rotation of the wave generator. The wave generator is configured to rotate about the longitudinal axis such that the flexible spline is arranged to selectively engage with the circular spline. The strain wave gear system further includes a bearing arrangement between and coaxial with the wave generator and the flexible spline. The bearing (Continued)

arrangement comprises a plurality of bearings and a cage arranged to retain the plurality of bearings. The plurality of bearings are located at more than two axial positions within the cage.

10 Claims, 10 Drawing Sheets

(56) References Cited

U.S. PATENT DOCUMENTS

| | | | |
|---|---|---|---|
| 10,253,863 B2 * | 4/2019 | Kiyosawa | ............ F16H 49/001 |
| 10,801,599 B2 | 10/2020 | Gilges | |
| 2013/0305864 A1 | 11/2013 | Schaefer et al. | |

FOREIGN PATENT DOCUMENTS

| | | |
|---|---|---|
| EP | 3225881 A1 | 10/2017 |
| JP | S60143246 A | 7/1985 |

OTHER PUBLICATIONS

Abstract for DE102021109838 (A1); Published: Oct. 20, 2022, 1 page.
Abstract for JPS60143246 (A); Published: Jul. 29, 1985, 1 page.
European Search Report for Application No. 23275057.0, mailed Sep. 12, 2023, 8 pages.

* cited by examiner

GEAR SYSTEM

CROSS REFERENCE TO RELATED APPLICATIONS

This application claims priority to European Patent Application No. 23275057.0 filed Apr. 5, 2023, the entire contents of which is incorporated herein by reference.

TECHNICAL FIELD

This disclosure relates to a strain wave gear system. In some examples, the disclosure relates to a strain wave gear system that uses a bearing arrangement located between a wave generator and a flexible spline.

BACKGROUND

A strain wave gear system typically includes a wave generator, a flexible spline and a circular spline. These elements are arranged coaxially. The flexible spline is arranged to deform around the perimeter of the wave generator, which is arranged to rotatably deform the flexible spline. The flexible spline includes outer teeth, which are arranged to mesh with the inner teeth of the circular spline. The flexible spline and the circular spline have a different number of teeth, which defines the gear ratio of the strain wave gear system.

The strain wave gear system may be used as a step-down gear or a step-up gear (e.g. for actuation applications). In some examples, a strain wave gear system may achieve a gear ratio of more than 1:40 in a step-up gear or 40:1 in a step-down gear. Therefore, strain wave gear systems are used to achieve a high gear ratio using a relatively simple and compact set of components. These features may be convenient in applications where space and weight are limited, such as in aerospace applications.

However, there are disadvantages to strain wave gear systems. The flexible spline is configured to deform to the non-circular shape of the wave generator, which places strain on the material of the flexible spline. The flexible spline is also required to transmit torque between the wave generator and the circular spline. Furthermore, the flexible spline is closely fitted between the wave generator and the circular spline. These factors all contribute towards high levels of stress applied to the flexible spline. High levels of stress may result in wear of the material of the flexible spline. If this causes damage to the flexible spline (e.g. cracks or brakes), then the lifetime of the system may be reduced, or the system may require frequent maintenance which increases the operating cost.

Therefore, an object of the present disclosure is to reduce the stress applied to the flexible spline in a strain wave gear system.

SUMMARY OF THE DISCLOSURE

According to a first aspect of the present disclosure, there is provided a strain wave gear system. The system includes: a circular spline arranged around a longitudinal axis; and a flexible spline within and coaxial with the circular spline; a wave generator within and coaxial with the flexible spline. The wave generator is non-circular in a plane perpendicular to the longitudinal axis and is arranged to rotate about the longitudinal axis. The flexible spline is arranged to flex in response to rotation of the wave generator, such that the flexible spline selectively engages with the circular spline. The system also includes a bearing arrangement between and coaxial with the wave generator and the flexible spline. The bearing arrangement comprises a plurality of bearings and a cage arranged to retain the plurality of bearings and the plurality of bearings are located at more than two axial positions within the cage.

The present disclosure relates to a strain wave gear system that includes a circular spline, a flexible spline, a wave generator and a bearing arrangement. The circular spline is arranged around a longitudinal axis, e.g. the circular spline is circular in a plane perpendicular to the longitudinal axis. In examples, the longitudinal axis is at the centre of the circular spline, e.g. the circular spline is rotationally symmetric (and, e.g., arranged to rotate) about the longitudinal axis.

The flexible spline is positioned within the circular spline and is coaxial with the circular spline, e.g. the flexible spline is centred on the longitudinal axis.

The wave generator is non-circular and rotates about the longitudinal axis. Therefore, the orientation of the (e.g. maximum diameter (e.g. major axis) of the) wave generator varies as the wave generator rotates. The flexible spline flexes (e.g. conforms to the shape of the wave generator) in response to the rotation of the wave generator, causing the shape of the flexible spline to change with the rotation of the wave generator, e.g. such that that the orientation of the shape (e.g. maximum diameter (e.g. major axis)) of the flexible spline changes (e.g. rotates) with the rotation of the wave generator.

The flexible spline is arranged to selectively engage with the circular spline (e.g. in the region of the maximum diameter (e.g. major axis)) of the wave generator and thus, e.g., flexible spline), owing to the flexing of the flexible spline, upon rotation of the wave generator. As the flexible spline flexes (e.g. conforms to the shape of the wave generator) as the wave generator rotates, the (e.g. outer surface of the) flexible spline selectively engages with the (e.g. inner surface of the) circular spline. This produces relative movement between the flexible spline and the circular spline. By using either the flexible spline or the circular spline as an output, for example, a gear system is provided in which the output gear rotates at a different speed to the input (e.g. the wave generator or a component driving the wave generator) of the system.

The bearing arrangement helps to couple the flexible spline to the wave generator. The bearing arrangement includes a plurality of bearings and a cage to hold the plurality of bearings in position.

The plurality of bearings are located at more than two axial positions within the cage. The axial position of a bearing may be measured relative to the cage, e.g. from the centre of the bearing to the (closest point at the) axial edge of the cage, i.e. in a direction parallel to the longitudinal axis of the strain wave gear system. Two bearings may have the same axial location but at different azimuthal positions of the cage.

By providing a plurality of bearings at more than two axial positions within the cage, the flexible spline may be supported across a greater proportion of its axial length. This may help to reduce the stress exerted on the flexible spline, which may help to reduce wear in the flexible spline. This may help to increase the lifetime of the flexible spline, thereby reducing the cost of maintaining or replacing the flexible spline.

The plurality of bearings may be retained in the cage in any suitable and desired way. In some examples, the plurality of bearings are each located in a recess of the cage. In some examples, the recess may form a tunnel through the cage (e.g. an aperture which extends through the entire radial extent of the cage, such that it is open at one or both of the inner and outer surfaces of the cage).

The plurality of bearings may be distributed in any suitable and desired manner across the bearing arrangement. In some examples, the plurality of bearings may be randomly distributed (i.e. there may be no identifiable pattern in the locations of the plurality of bearings). In some examples, the location of the plurality of bearings may form a pattern, such as a lattice, array or grid. In some examples, the location of the plurality of bearings may form a (e.g. regular) pattern that repeats over substantially the entire bearing arrangement.

In some examples, the plurality of bearings are arranged in a plurality of rows. Each of the plurality of rows may comprise any number of bearings. The plurality of rows may extend in any direction. The plurality of rows may extend across any dimension of the bearing arrangement. In some examples, the plurality of rows may not extend to one or both of the axial ends of the bearing arrangement (and thus, for example, the cage may extend further (in the axial direction) than the plurality of rows at one or both axial ends of the bearing arrangement). In some examples, the plurality of rows may extend beyond one or both of the axial ends of the cage (i.e. at least part of a surface of a bearing may extend beyond the edge of the cage).

In some examples, each of the plurality of rows extends in an axial direction (i.e. in a direction that is substantially parallel to the longitudinal axis). In some examples, there may be gaps (i.e. spaces) in the azimuthal direction between adjacent rows (the extent of the rows defined by the perimeter of the bearings, for example). In some examples, there may be no gap in the azimuthal direction between adjacent rows (the extent of the rows defined by the perimeter of the bearings, for example). In some examples, adjacent rows of the plurality of rows may at least partially overlap in the azimuthal direction (the extent of the rows defined by the perimeter of the bearings, for example), e.g. with the axial position of bearings in adjacent rows being offset from each other.

In some examples, each of the plurality of rows comprises a plurality of bearings. In some examples, different rows may comprise different numbers of bearings (i.e. not all rows may contain the same number of bearings). In some examples, adjacent rows contain a different number of bearings. In some examples, the number of bearings in each row alternates between adjacent rows (e.g. every other row contains the same number of bearings).

In some examples, the (e.g. perimeters of the) bearings are spaced from each other in one or more (e.g. all) of the plurality of rows. In some examples, the bearings may be evenly spaced in a (e.g. each) row. In some examples, the centres of the plurality of bearings in a row may align along a direction parallel to the longitudinal axis.

In some examples, the (positions (e.g. centres) of the) bearings in each of the plurality of rows are offset in the axial direction from the (positions (e.g. centres) of the) bearings in an adjacent row. That is, in some examples, bearings in adjacent rows do not have the same axial positions as each another. In some examples, the axial extent of the bearings in adjacent rows overlap but do not completely coincide (e.g. the bearings in adjacent rows may have a different axial extent).

This overlapping arrangement may help to support the flexible spline across the axial length of the bearing arrangement. In each of the plurality of rows, there may be spaces between (e.g. the perimeters of) adjacent bearings. The flexible spline is not supported by a bearing in these spaces. However, in the overlapping (e.g. offset) arrangement, the flexible spline may be supported proximal to each of these spaces by a bearing in an adjacent row. By providing support across a greater surface area, the bearing arrangement may help to reduce stress on the flexible spline. This arrangement may also help to reduce the extent to which the flexible spline deforms in the axial direction, which may help to reduce wear on the flexible spline.

In some examples, the plurality of bearings are spherical. In some examples, the plurality of bearings are ball bearings. However, the plurality of bearings may be any suitable and desired shape and size (e.g. a sphere, an ellipsoid and/or a cylinder). In some examples, the plurality of bearings may be of differing shapes and/or sizes (i.e. not all of the plurality of bearings must be the same shape and/or size).

In some examples, the plurality of bearings are configured to rotate around at least one axis relative to the cage. The plurality of bearings may be configured to rotate at least around an axis that is parallel to the longitudinal axis. Rotation around an axis that is parallel to the longitudinal axis may help to allow the flexible spline to conform to the rotation of the wave generator.

In some examples, the plurality of bearings are free to rotate in any direction relative to the cage. In some examples, the plurality of bearings are each retained in a recess of the cage. The plurality of bearings may be free to rotate in any direction within the recess. Therefore, the presence of the cage may, in some examples, not place any limitations on the possible directions of rotation of the plurality of bearings.

In some examples, the plurality of bearings are configured to move in a radial direction relative to the cage. In some examples, the plurality of bearings are each retained in a recess of the cage. The plurality of bearings may be free to move in a radial direction within the recess (e.g. they are not secured at any particular radial position within the cage). In some examples, each of the plurality of bearings may be free to move radially such that at least part of the surface (e.g. perimeter) of the bearing extends beyond the outer and/or inner surface of the cage.

In some examples, the radial position of each of the plurality of bearings, relative to the cage, may depend upon the position of the bearing within the strain wave gear system, e.g. relative to the angular position of the wave generator. For example, the plurality of bearings may be configured to move radially inwards (i.e. towards the longitudinal axis) in the region of the major axis of the wave generator. This may be due at least in part to the reduced amount of space available for the plurality of bearings in the region where the flexible spline engages with the circular spline.

In some examples, the plurality of bearings may be configured to move radially outwards (i.e. away from the longitudinal axis) in the region of the minor axis of the wave generator. This may be due at least in part to the increased amount of space available for the plurality of bearings in the region where the flexible spline is not (or is less) engaged with the circular spline.

In some examples, the plurality of bearings being configured to move in a radial direction relative to the cage may help the bearing arrangement to conform to the shape of the wave generator, thereby helping to ensure that torque is transmitted between the wave generator and the other components of the strain wave gear system.

In some examples, the flexible spline has a greater axial length than the circular spline and/or the wave generator. In some examples, this may help to reduce the stress on the spline (e.g. the stress applied due to the deformation of the flexible spline around the perimeter of the wave generator). For example, by increasing the axial length of the flexible spline the gradient of the deflection of the flexible spline may be reduced (as any change in radius of the flexible spline may be distributed over a greater axial length).

In some examples, the wave generator is elliptical in a plane perpendicular to the longitudinal axis of the circular spline. In these examples, the wave generator has a major axis in the direction of its maximum diameter and a minor axis in the direction of its minimum diameter. The elliptical shape may have any suitable and desired eccentricity.

The wave generator may be driven (rotated) in any suitable and desired way. In some examples, the wave generator is (e.g. mounted on and) driven by a (rotatable) drive shaft.

In some examples, the flexible spline is configured to deform around the perimeter of the wave generator. In some examples, the flexible spline may be formed of a flexible metal and/or plastic. Suitable materials may allow the flexible spline to elastically deform around the perimeter of the wave generator, whilst also having other suitable material properties such as high strength and hardness (e.g. so that the flexible spline is suitable for transferring torque to the circular spline).

In some examples, the flexible spline is configured to deform around the perimeter of the wave generator such that the flexible spline is substantially elliptical in a plane perpendicular to the longitudinal axis (at least at the (axial) position that the flexible spline engages with the wave generator (via the bearing arrangement)). In some examples, the flexible spline may deform such that it has substantially the same eccentricity as the wave generator.

In some examples, the radius of the wave generator varies along its axial length. The radius of the wave generator may vary along its axial length in any suitable and desired way. In some examples, the radius of the wave generator may vary such that the surface of the wave generator is curved (in the axial direction). In some examples, the radius of the wave generator is smaller at each of the axial ends of the wave generator than at the centre of the wave generator. In some examples, this may help to provide support to the flexible spline across the axial length of the wave generator, by more closely following the shape of the flexible spline as it deforms around the perimeter of the wave generator.

In some examples, the flexible spline is cup-shaped. A cup-shaped flexible spline may comprise a central (e.g. cylindrical) portion (arranged around the longitudinal axis of the strain wave gear system) and at least one surface that is substantially perpendicular to the longitudinal axis located at an axial end of the central portion of the flexible spline. In some examples, the perpendicular surface(s) may extend over substantially the whole of the axial end(s) of the central portion. In some examples, the perpendicular surface(s) may extend over only part of the axial end(s) of the central section.

In some examples, the cup-shaped flexible spline may include at least one curved transition region, which connects the central portion to the perpendicular surface(s). In some examples, the curved transition region(s) may help to provide flexibility to the flexible spline, which may help the flexible spline to deform around the perimeter of the wave generator. In particular, the curved transition region(s) may help the flexible spline to deform around a wave generator in which the radius varies over the axial length of the wave generator. Therefore, a strain wave generator of the present disclosure may advantageously comprise a cup-shaped flexible spline and a wave generator, wherein the radius of the wave generator varies across the axial length of the wave generator.

In some examples, the circular spline comprises a plurality of inner teeth, the flexible spline comprises a plurality of outer teeth, and the plurality of inner teeth of the circular spline are configured to mesh with the plurality of outer teeth of the flexible spline.

Thus, in the region of the maximum diameter (e.g. major axis) of the wave generator, the teeth of the flexible spline are configured to engage with the teeth of the circular spline. As the flexible spline flexes (e.g. conforms to the shape of the wave generator) in response to the rotation of the wave generator, the teeth of the flexible spline selectively engage with the teeth of the circular spline, such that the point of engagement between the flexible spline and the circular spline changes (e.g. rotates) with the rotation of the wave generator.

The plurality of teeth of both the circular spline and the flexible spline may be any suitable and desired size, shape and pitch. The plurality of teeth of the circular spline may be a different size, shape and/or pitch to the plurality of teeth of the flexible spline.

In some examples, the circular spline has a different number of teeth than the flexible spline. In some examples, the circular spline may have more teeth than the flexible spline. In some examples, the difference between the number of teeth of the circular spline and the number of teeth of the flexible spline may define the gear ratio of the strain wave generator.

In some examples, the gear ratio R of the strain wave generator may be defined as:

$$R = \frac{n_{flexible} - n_{circular}}{n_{flexible}}$$

where $n_{flexible}$ is the number of teeth of the flexible spline and $n_{circular}$ is the number of teeth of the circular spline.

In some examples, the plurality of inner teeth of the circular spline are configured to mesh with the plurality of outer teeth of the flexible spline in the region of the maximum diameter (e.g. major axis) of the flexible spline (corresponding to the maximum diameter (e.g. major axis) of the wave generator). The plurality of teeth may mesh together at both ends of the maximum diameter (e.g. major axis), i.e. at diametrically opposite points of the flexible spline, at the point of maximum diameter. Any number of the plurality of teeth may mesh together in the region(s) of the major axis. In some examples, up to 5 teeth may mesh together in the region(s) of the major axis. In some examples, up to 10 teeth may mesh together in the region(s) of the major axis. In some examples, up to 20 teeth may mesh together in the region(s) of the major axis.

In some examples, the flexible spline is configured to rotate and the circular spline is configured to remain stationary during operation of the strain wave gear system. In these examples, the output of the gear system may be linked to the flexible spline. In some examples, the flexible spline may be used directly as the output. In some examples, another component (e.g. an output shaft) may be connected to the flexible spline to be used as the output.

In some examples, the circular spline is configured to rotate and the flexible spline is configured to remain stationary during operation of the strain wave gear system. In these examples, the output of the gear system may be linked to the circular spline. In some examples, the circular spline may be used directly as the output. In some examples, another component (e.g. an output shaft) may be connected to the circular spline to be used as the output.

In some examples, at least one of the axial ends of the flexible spline may be held or supported in its intended (e.g. stationary) position. This may help to reduce stress on the flexible spline, by helping to prevent or reduce deformation of the flexible spline in the region of the axial ends. In examples where the flexible spline is stationary and the circular spline rotates, this may also help to ensure that the flexible spline remains stationary during operation of the strain wave gear system.

In some examples, at least one of the axial ends of the flexible spline may be held stationary by a circular earth spline. In some examples, the flexible spline may be held stationary by a circular earth spline at both of its axial ends (e.g. by one circular spline at each axial end). In some examples, the circular earth spline(s) may be coaxial with the flexible spline and have a larger diameter than the flexible spline. In some examples, the circular earth spline(s) may have a plurality of inner teeth configured to mesh with the plurality of outer teeth of the flexible spline. In some examples, the circular earth spline(s) may have the same number of teeth as the flexible spline, such that all of the inner teeth of the circular earth spline(s) may be meshed with all of the outer teeth of the flexible spline. This may allow the circular earth spline(s) to hold the flexible spline stationary.

In some examples, the strain wave gear system is a step-down gear system (i.e. the output of the strain wave gear system rotates more slowly than the input of the strain wave gear system). In some examples, the gear ratio may have a magnitude of at least 40:1. In some examples, the gear ratio may have a magnitude of at least 60:1. In some examples, the gear ratio may have a magnitude of at least 80:1. In some examples, the gear ratio may have a magnitude of at least 100:1. In some examples, the gear ratio may be negative, meaning that the output rotates in the opposite direction to the input (e.g. if the input is clockwise then the output is anticlockwise).

BRIEF DESCRIPTION OF THE DRAWINGS

Certain examples of the present disclosure will now be described with reference to the accompanying drawings in which.

DETAILED DESCRIPTION

Figure 1:
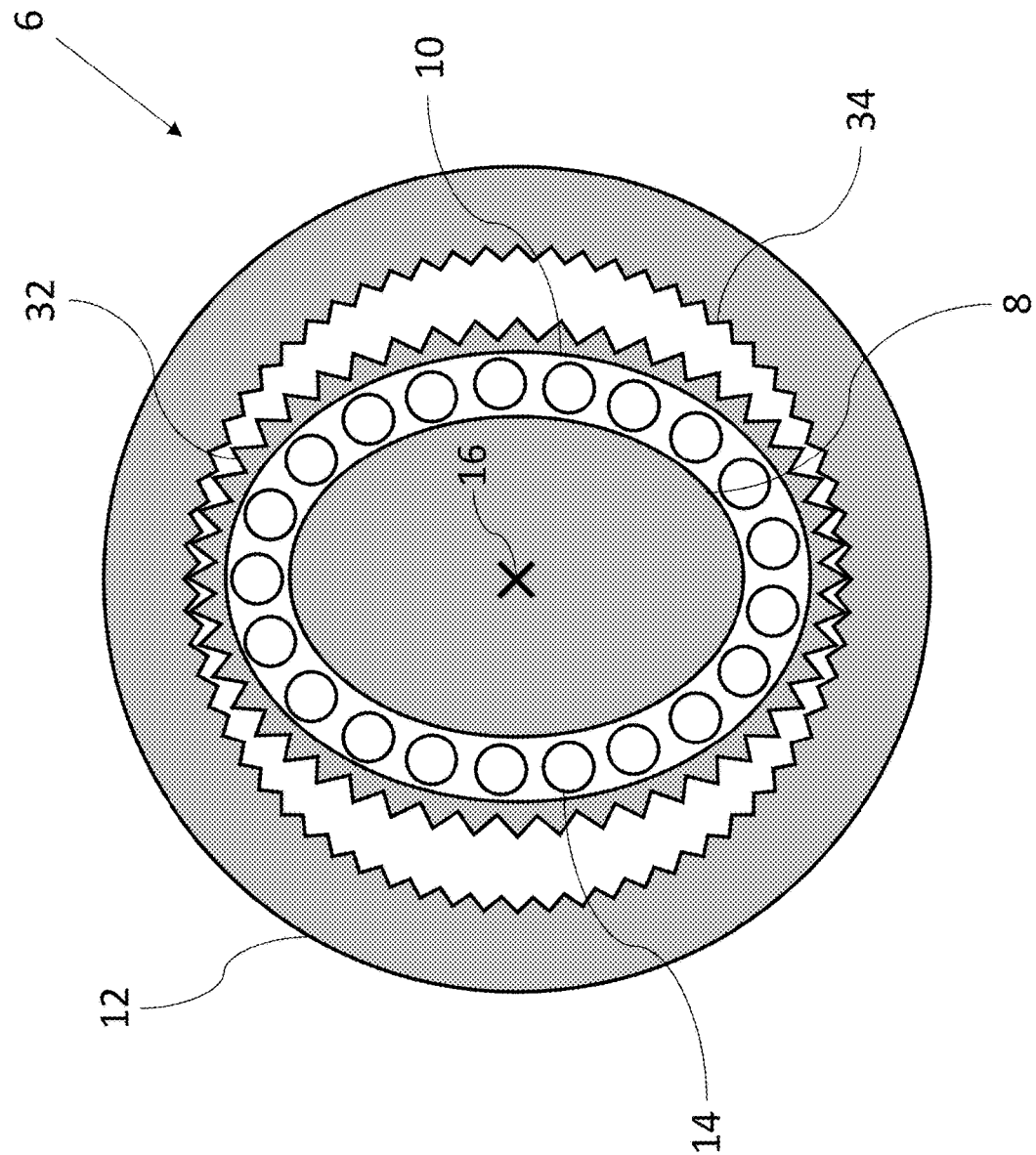
FIG. 1 shows a cross-sectional view of a strain wave gear system in accordance with examples of the present disclosure.

FIG. 1 shows, schematically, a cross-sectional view of a strain wave gear system 6 according to an example of the present disclosure. The strain wave gear system 6 includes a wave generator 8, a flexible spline 10, a circular spline 12 and a bearing arrangement 14.

The wave generator 8, flexible spline 10, circular spline 12 and bearing arrangement 14 are arranged concentrically about a common longitudinal axis 16.

In this example, the wave generator 8 is elliptical in shape in a plane perpendicular to the longitudinal axis 16. The eccentricity of the elliptical shape of the wave generator 8 is exaggerated in FIG. 1.

The flexible spline 10 is arranged around the perimeter of the wave generator 8. The flexible spline 10 is configured to conform to the shape of the wave generator 8 via the bearing arrangement 14. The flexible spline 10 may be formed of any suitable material that allows it to deform around the shape of the wave generator 8. In some examples, the flexible spline 10 is formed of a flexible metal, which allows the flexible spline 10 to bend while still maintaining high strength and hardness.

The strain wave gear system 6 further includes a circular spline 12. The circular spline 12 includes a plurality of teeth 34 on its inner surface (i.e. on the surface facing towards the flexible spline 10). The flexible spline 10 includes a plurality of teeth 32 on its outer surface (i.e. on the surface facing away from the wave generator 8). The plurality of teeth 32 of the flexible spline 10 are configured to mesh with the plurality of teeth 34 of the circular spline 12. In particular, the plurality of teeth 32, 34 are configured to mesh with one another in the region of the major axis of the wave generator 8 (i.e. in the region where the radius of the wave generator 8 is at a maximum).

A bearing arrangement 14 is arranged around the perimeter of the wave generator 8, between the wave generator 8 and the flexible spline 10. The bearing arrangement 14 is coaxial with the longitudinal axis 16. The bearing arrangement 14 allows the wave generator 8 to rotate within the bearing arrangement 14.

The operation of the strain wave gear system 6 will now be described in reference to FIG. 1.

The wave generator 8 is non-circular and rotates about the longitudinal axis 16. Therefore, the orientation of the major axis (i.e. maximum diameter) of the wave generator 8 varies as the wave generator 8 rotates. The flexible spline 10 conforms to the shape of the wave generator 8, meaning that the orientation of the major axis (i.e. maximum diameter) of the flexible spline 10 moves with that of the wave generator 8.

In the region of the major axis (i.e. maximum diameter) of the wave generator 8, the teeth 32 of the flexible spline 10 are configured to engage with the teeth 34 of the circular spline 12. Therefore, as the flexible spline 10 conforms to the shape of the wave generator 8 and the orientation of the major axis varies, the teeth 32 of the flexible spline 10 selectively engage with the teeth 34 of the circular spline 12.

However, the circular spline 12 and the flexible spline 10 have a different number of teeth. This produces relative movement between the flexible spline 10 and the circular spline 12. The relative number of teeth defines the reduction ratio R of the strain wave gear system 6. In some examples:

$$R = \frac{n_{flexible} - n_{circular}}{n_{flexible}}$$

where $n_{flexible}$ is the number of teeth of the flexible spline 10 and $n_{circular}$ is the number of teeth of the circular spline 12.

For example, if the flexible spline 10 has 100 teeth and the circular spline 12 has 102 teeth, then the reduction ratio R=−0.02, meaning that the output (i.e. the flexible spline 10 or the circular spline 12) rotates at $\frac{1}{50}^{th}$ of the speed of the wave generator 8, in the opposite direction.

In other words, for every 100 (e.g. clockwise) rotations of the wave generator 8, the teeth 32 of the flexible spline 12 move along by a distance of two teeth in the opposite (e.g. anticlockwise) direction relative to the teeth 34 of the circular spline 12.

In some examples, the circular spline 12 is stationary and the flexible spline 10 moves, thus the output of the strain wave gear system 6 is related to the movement of the flexible spline 10. In some examples, the flexible spline 10 is stationary and the circular spline 12 moves, thus the output of the strain wave gear system 6 is related to the movement of the circular spline 12.

Figure 2:
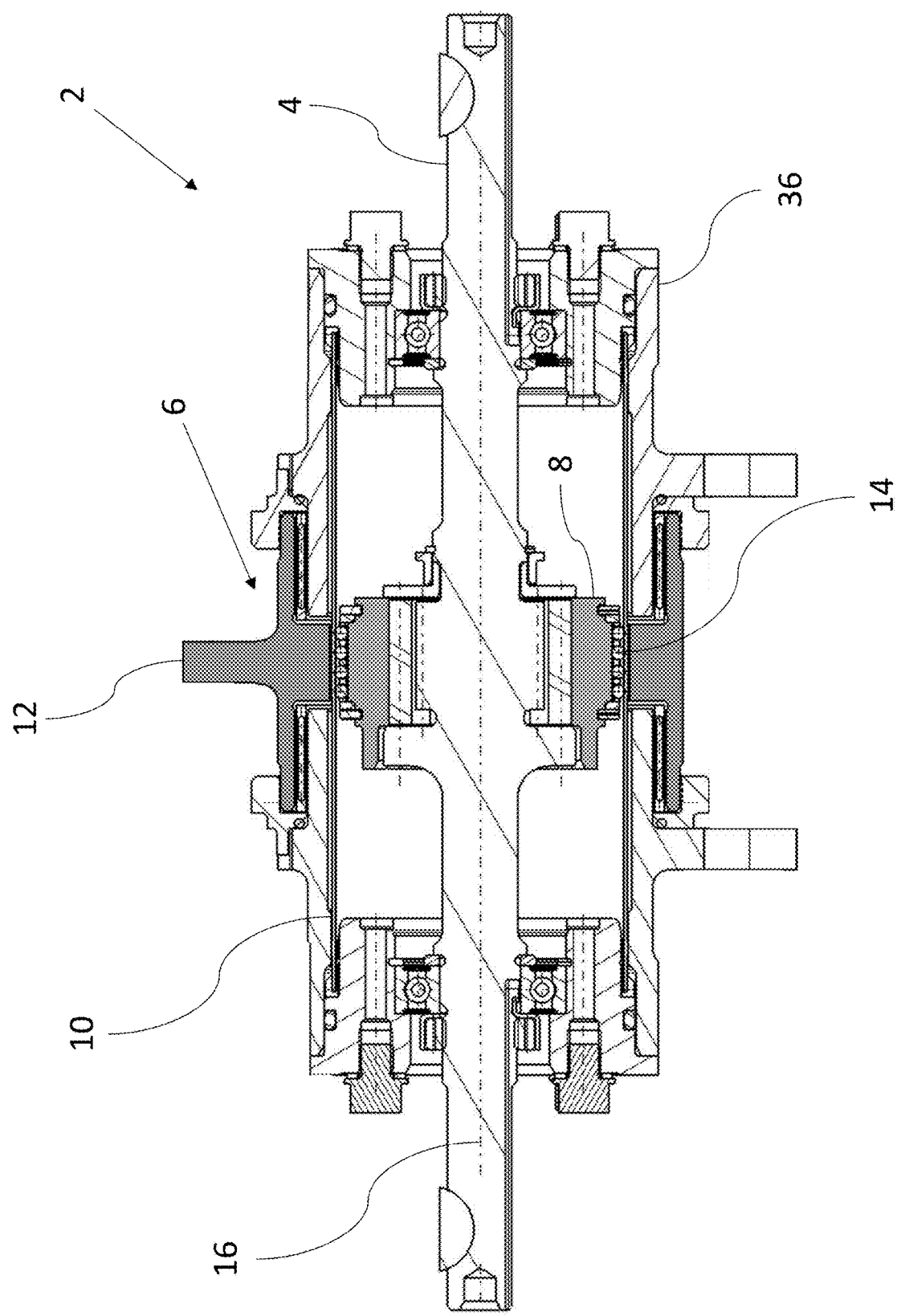
FIGS. 2 and 3 show cross-sectional views of drive arrangements in accordance with examples of the present disclosure.
Figure 3:
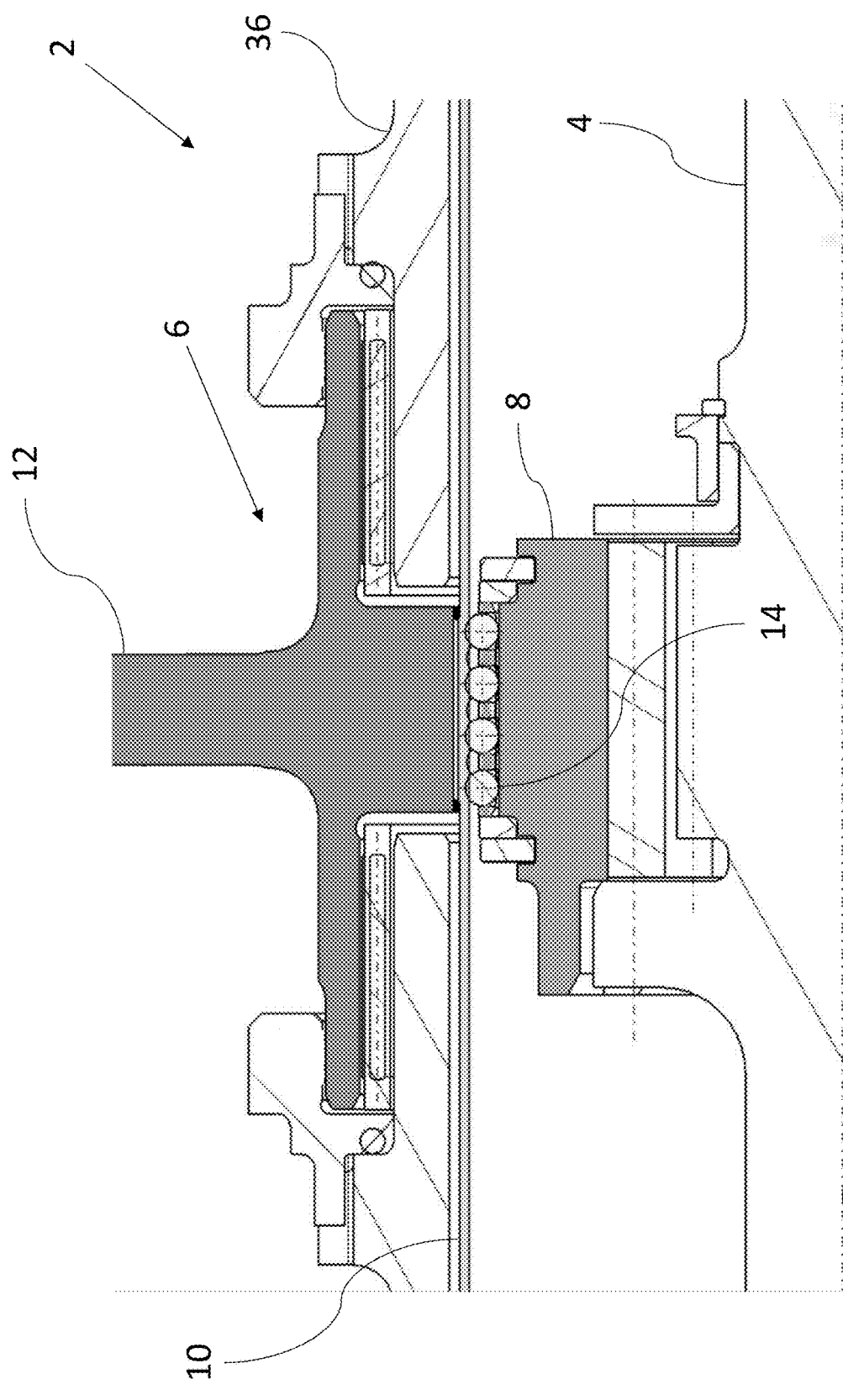

FIGS. 2 and 3 are cross-sectional views of drive arrangements 2 according to examples of the present disclosure.

The drive arrangements 2 of FIGS. 2 and 3 include a drive shaft 4 and a strain wave gear system 6. The strain wave gear system 6 includes a wave generator 8, a flexible spline 10, a circular spline 12 and a bearing arrangement 14. The drive shaft 4, wave generator 8, flexible spline 10, circular spline 12 and bearing arrangement 14 are arranged concentrically about a common longitudinal axis 16.

The drive shaft 4 is arranged to rotatably drive the wave generator 8. In this example, the wave generator 8 is arranged around the perimeter of the drive shaft 4. However, it will be understood that the drive shaft 4 may be connected to the wave generator 8 in any suitable way. For example, in some embodiments the wave generator 8 may be connected to an end of the drive shaft 4.

In the examples of FIGS. 2 and 3, the flexible spline 10 has a greater extent in the axial direction 16 than the wave generator 8. This may help to reduce the stress exerted on the flexible spline 10 as it deforms around the wave generator 8, by reducing the angular deflection of the flexible spline 10 (i.e. by increasing the axial distance over which radial deflection is distributed).

In the examples of FIGS. 2 and 3, the flexible spline 10 is being supported by the housing 36 of the drive arrangement 2. In some examples, the housing 36 may help to prevent the axial end(s) of the flexible spline 10 from deforming, which may help to reduce stress in the flexible spline 10. In some examples, the housing 36 may help to keep the flexible spline 10 stationary (e.g. in examples where the output of the strain wave gear system 6 is related to the movement of the circular spline 12).

Figure 4:
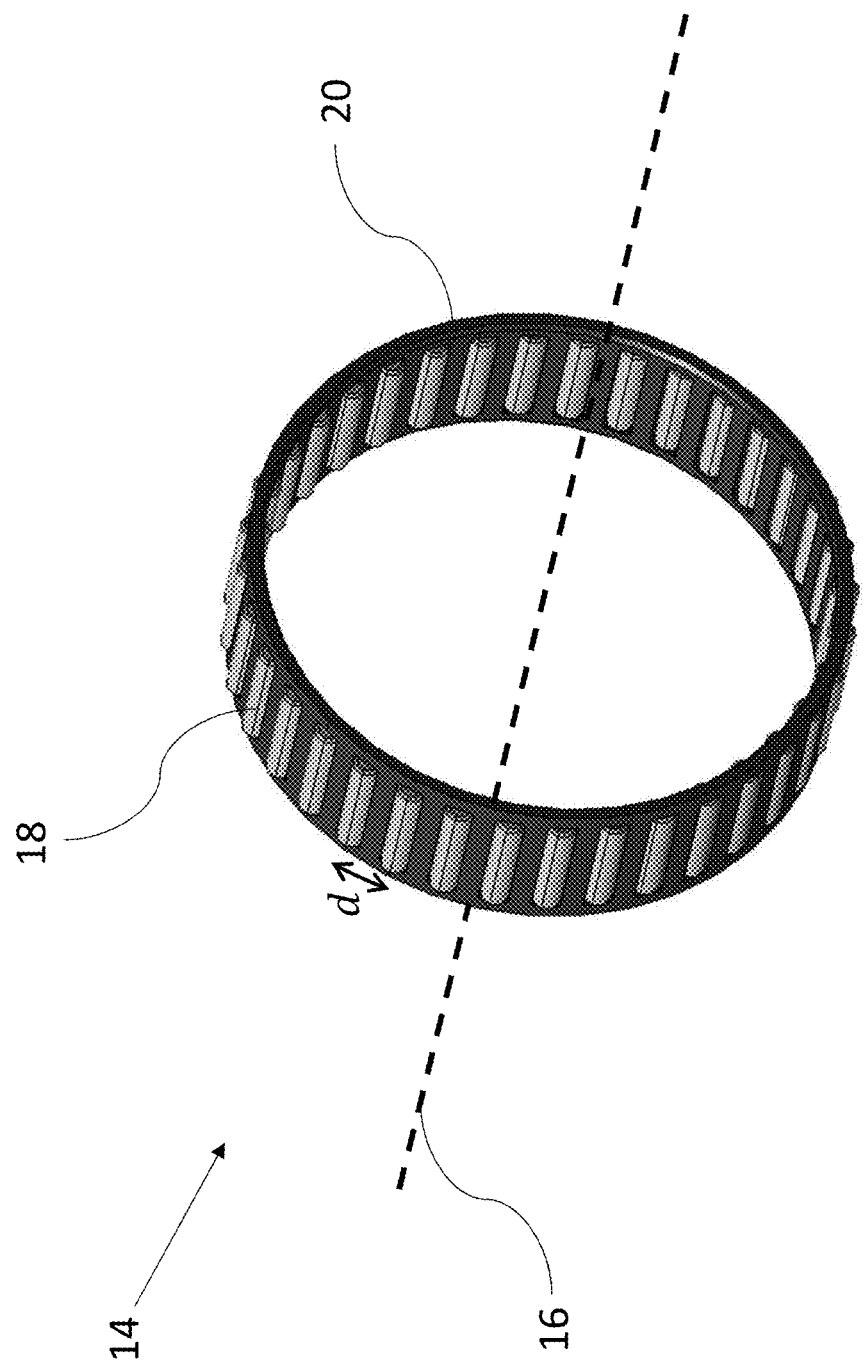
FIG. 4 shows a perspective view of a bearing arrangement.

FIG. 4 is a perspective view of a bearing arrangement 14. The bearing arrangement 14 shown in FIG. 4 may be used in a strain wave generator system 6. The bearing arrangement 14 includes a plurality of straight roller bearings 18 and a cage 20. The cage 20 is configured to support and retain the plurality of straight roller bearings 18 in their intended position. The straight roller bearings 18 are free to rotate about their longitudinal axis. This rotation allows the flexible spline 10 to move relative to the wave generator 8.

FIG. 4 shows a perspective view of a bearing arrangement 14

In the bearing arrangement 14 shown in FIG. 4, there is a distance, d, between adjacent straight roller bearings 18. The straight roller bearings 18 have to be separated by a distance, d, in order for the cage 20 to retain its structural properties. For example, if the straight roller bearings 18 were too close together the cage 20 may lose its strength, due to the volume of material removed to form holes for the straight roller bearings 18.

However, the distance, d, between adjacent straight roller bearings 18 can produce stress in the flexible spline 10, in particular in the regions between the plurality of teeth 32. High stress on the flexible spline 10 may be associated with a faster rate of degradation of the material. Therefore, the flexible spline 10 may need to be repaired or replaced more often.

Figure 5:
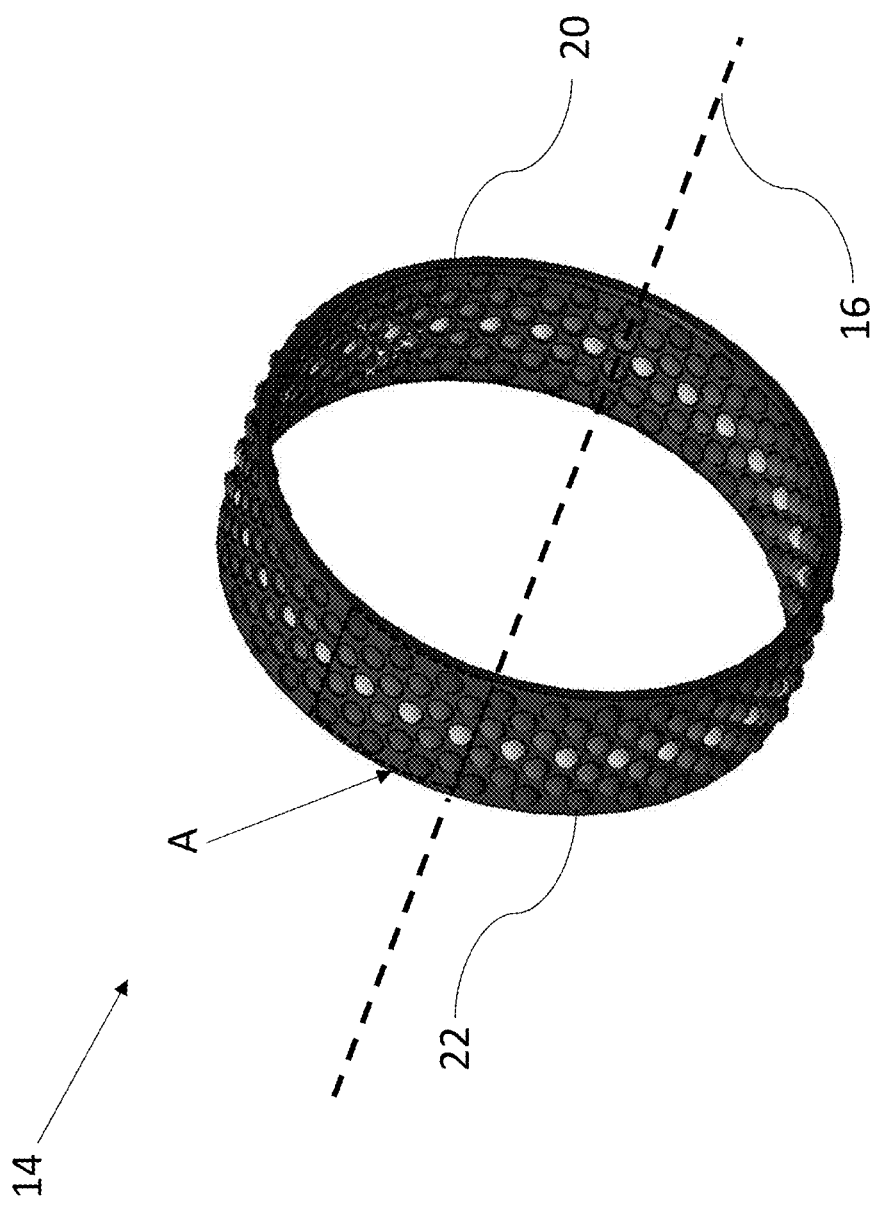
FIG. 5 shows a perspective view of a bearing arrangement in accordance with an example of the present disclosure.

FIG. 5 is a perspective view of a bearing arrangement 14 according to an example of the present disclosure. The bearing arrangement 14 shown in FIG. 5 may be used in a strain wave generator system 6. The bearing arrangement 14 includes a plurality of bearings 22 and a cage 20 arranged to support and retain the plurality of bearings 22 in their intended position. In FIG. 5, only one of the plurality of bearings 22 is labelled for clarity. In this example, the plurality of bearings 22 are spherical (i.e. they are ball bearings).

The plurality of bearings 22 have at least one degree of freedom for movement within the cage 20. The plurality of bearings 22 may be able to rotate about at least one axis. In some examples, the plurality of bearings 22 are able to rotate at least around an axis that is parallel to the longitudinal axis 16. This may help to ensure that the flexible spline 10 is able to move at a different speed and/or in a different direction to the wave generator 8 (i.e. that the flexible spline 10 can move across the surface of the wave generator 8, supported by the plurality of bearings 22). In some examples, the plurality of bearings 22 may be able to rotate freely (i.e. around any axis) whilst being supported and retained by the cage 20.

FIG. 5 shows a perspective view of a bearing arrangement 14 according to an example of the present disclosure.

In some examples, the plurality of bearings 22 are able to move radially with respect to the cage 20. For example, the plurality of bearings 22 may move radially (e.g. inwards) with respect to the cage 20 in the region of the major axis of the flexible spline 10 (i.e. in the region where the plurality of teeth of the flexible spline 10 mesh with the plurality of teeth of the circular spline 12). In some examples, this may help to create space for the plurality of teeth of the flexible spline 10 to mesh with the plurality of teeth of the circular spline 12

The plurality of bearings 22 being able to move radially within the cage 20 may be particularly advantageous in examples of the present disclosure which use a barrelled wave generator, which will be discussed in detail in relation to FIG. 8.

Figure 6:
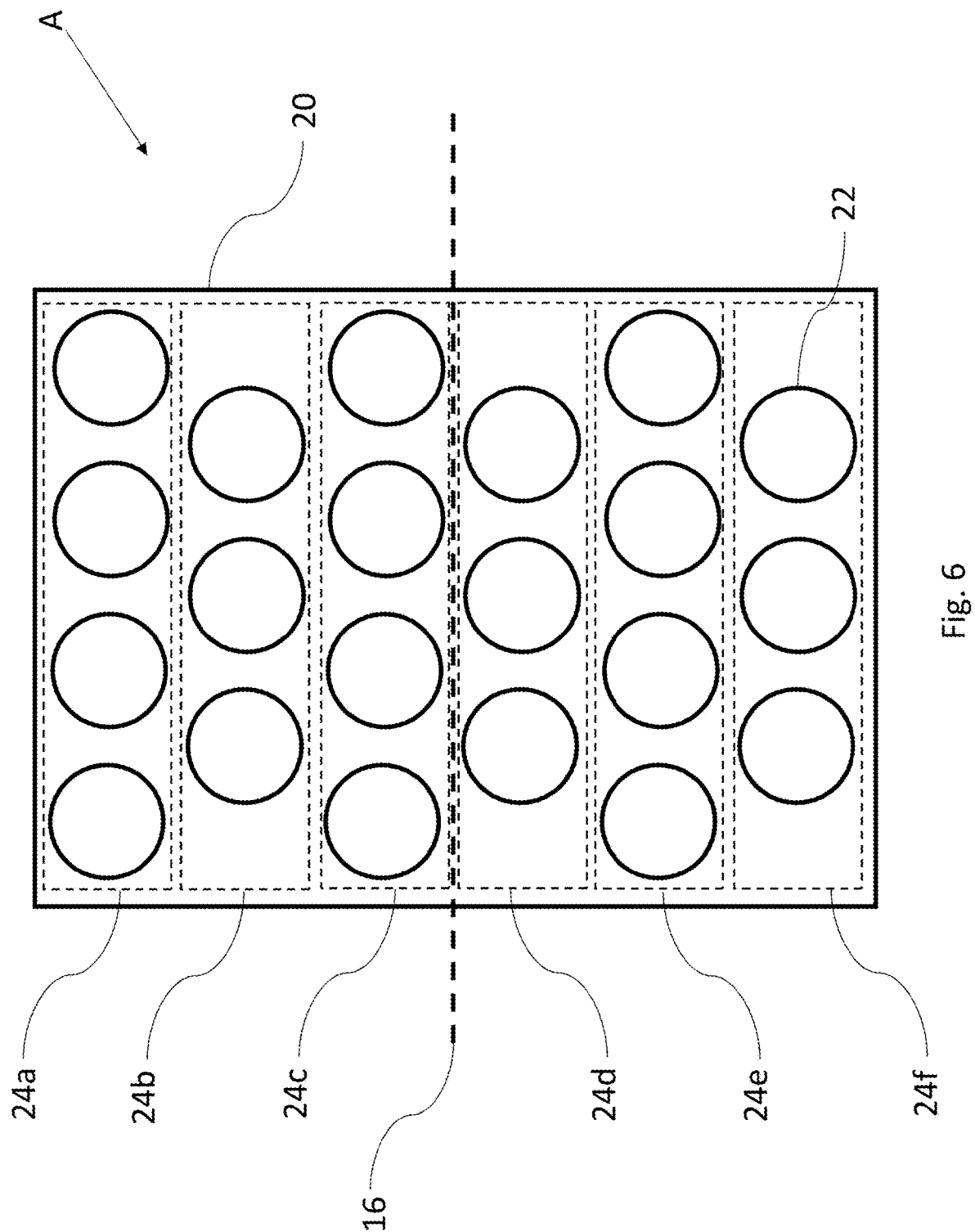
FIG. 6 shows a schematic view of a bearing arrangement in accordance with an example of the present disclosure.

FIG. 6 is a schematic view of a bearing arrangement 14 according to an example of the present disclosure. FIG. 6 is a plan view of Section A shown in FIG. 5.

In this example, the plurality of bearings 22 are arranged in a plurality of rows 24a-f which each extend along the axial direction 16. In this example, rows 24a, 24c and 24e each include four bearings 22. Each of the rows 24a, 24c and 24e are similar in that the position and spacing of the four bearings 22 in each of the rows 24a, 24c and 24e is substantially the same. In this example, rows 24b, 24d and 24f each include three bearings 22. Each of the rows 24b, 24d and 24f are similar in that the position and spacing of the three bearings 22 in each of the rows 24b, 24d and 24f is substantially the same.

The bearings 22 in each adjacent row (e.g. 24a and 24b) are offset from one another in the axial direction 16. In this example, the axial extent of the bearings 22 in adjacent rows (e.g. 24a and 24b) overlap but do not completely coincide (i.e. the bearings 22 in adjacent rows (e.g. 24a and 24b) do not have exactly the same axial extent).

This overlapping arrangement may help to provide support to the flexible spline 10 across the axial length of the bearing arrangement 14. In each of the plurality of rows 24, there are spaces between adjacent bearings 22. The flexible spline 10 is not supported by a bearing 22 in these spaces. However, in the overlapping arrangement shown in FIGS. 5 and 6, the flexible spline 22 is supported proximal to each of these spaces by a bearing 22 in an adjacent row 24. By providing support across a greater surface area, the bearing arrangement 22 shown in FIGS. 5 and 6 may help to reduce stress on the flexible spline 10. This arrangement may also help to reduce the extent to which the flexible spline 10 deforms in the axial direction, which may help to reduce wear on the flexible spline 10.

It will be understood that the bearing arrangement 14 is not limited to the configuration shown in FIGS. 5 and 6. There are a number of parameters that may be varied (e.g. based on the parameters or limitations of the system being used). For example, any number of the following features may be varied: the number of bearings 22 in each of the plurality of rows 24; the space between adjacent bearings 22 in each of the plurality of rows 24; the extent to which the axial extent of the plurality of bearings 22 in adjacent rows 24 overlap; the size and/or shape of the bearings 22; the number of rows 24; and/or the space between adjacent rows 24.

Figure 7:
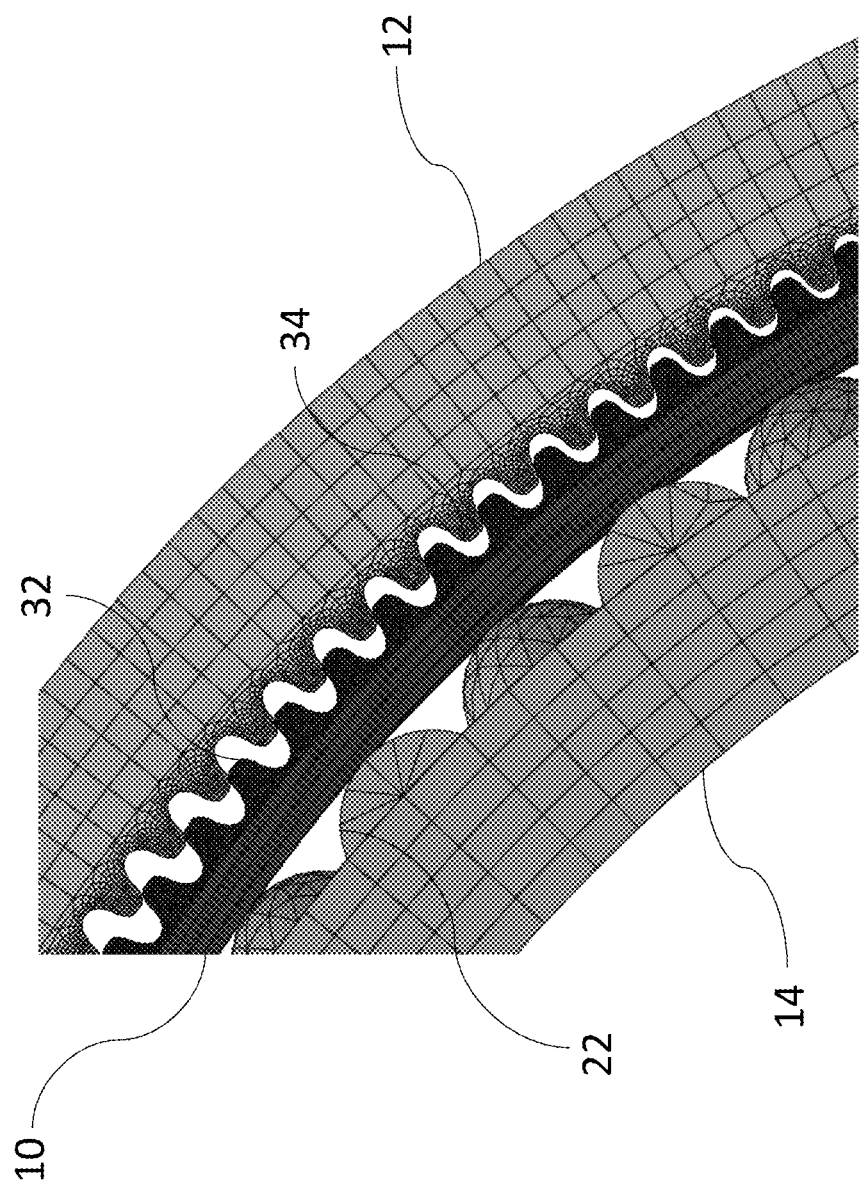
FIG. 7 shows a cross-sectional view of a strain wave gear system in accordance with an example of the present disclosure.

FIG. 7 is a cross-sectional view of a strain wave gear system 6 according to an example of the present disclosure. In this example, the bearing arrangement 14 includes a plurality of bearings 22 in accordance with an example of the present disclosure. For clarity, only one of the plurality of bearings 22 is labelled in the figure. Similarly, only one of the plurality of teeth 32 of the flexible spline 10 and one of the plurality of teeth 34 of the circular spline 12 are labelled.

In this example, the distance between adjacent rows 24 in the bearing arrangement 14 of the present disclosure is less than the distance between adjacent straight roller bearings 18 in a typical bearing arrangement. Unlike the straight roller bearings 18, the bearings 22 of the present disclosure do not occupy substantially the entire axial length of the bearing arrangement 14. Therefore, the cage 20 includes material between adjacent bearings 22 which helps to ensure that the material properties (e.g. strength) of the cage 20 are maintained, even in examples where the rows 24 of bearings 22 are closer together.

The shorter distance between adjacent rows 24 of bearings 22 may help to increase the number of rows 24 of bearings 22, thereby increasing the surface area of the bearing arrangement 14 that is in contact with the surface of the flexible spline 10 (compared to a bearing arrangement with straight roller bearings 18). Therefore, the pressure and torque transferred from the bearing arrangement 14 to the flexible spline 10 may be more evenly distributed around the circumference of the flexible spline 10. This may help to reduce the stress exerted on the flexible spline 10. This may also help to reduce the amount by which the flexible spline 10 bends into the spaces between the rows 24 of bearings 22. Therefore, the wear on the flexible spline 10 may be reduced by using a bearing arrangement 14 of the present disclosure, compared to a typical arrangement using straight roller bearings 18.

The bearing arrangement 14 of the present disclosure may also be advantageous in examples where the strain wave gear system 6 incudes a barrelled wave generator 30. FIG. 8 is a cross-sectional side view of a strain wave gear system 6 according to an example of the present disclosure. FIG. 8 is showing a side view of the top half of a strain wave gear system 6. The longitudinal axis 16 is shown at the bottom of FIG. 8.

In this example, the strain wave gear system 6 includes a barrelled wave generator 30. The radius, r, of the barrelled wave generator 30 varies along the axial direction 16 of the strain wave gear system 6. In this example, the radius, r, is smallest at the two axial ends of the wave generator 30 (i.e. at the leftmost and rightmost points in the figure). The radius, r, of the barrelled wave generator 30 has a maximum at the centre of the wave generator 30, wherein the centre is measured along the axial direction 16 of the strain wave gear system 6. In this example, the wave generator 30 is curved along the axial direction 16. However, the radius, r, may vary along the axial length of the wave generator 30 in any suitable and desired way.

In this example, the bearings 22 of the bearing arrangement 14 have a degree of freedom in the radial direction. Therefore, the bearings 22 are able to move radially inwards or outwards, such that the bearing arrangement 14 conforms to the shape (e.g. the curved edge) of the barrelled wave generator 30 (e.g. such that the bearing arrangement 14 remains in contact with the surface of the barrelled wave generator 30). This may help to ensure that torque is transferred effectively between the barrelled wave generator 30 and the flexible spline 10 across the entire axial length of the bearing arrangement 14.

Figure 9:
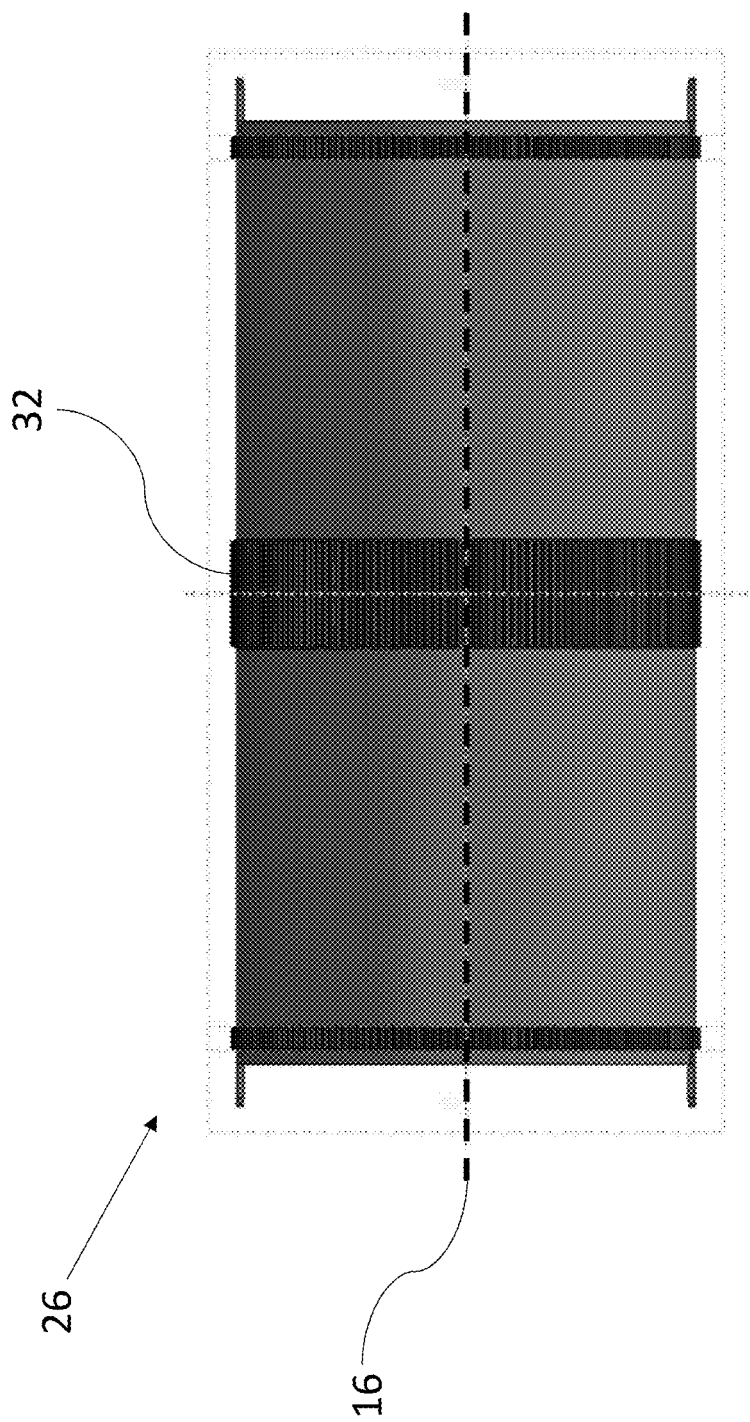
FIGS. 9 and 10 show side views of flexible splines in accordance with examples of the present disclosure.
Figure 10:
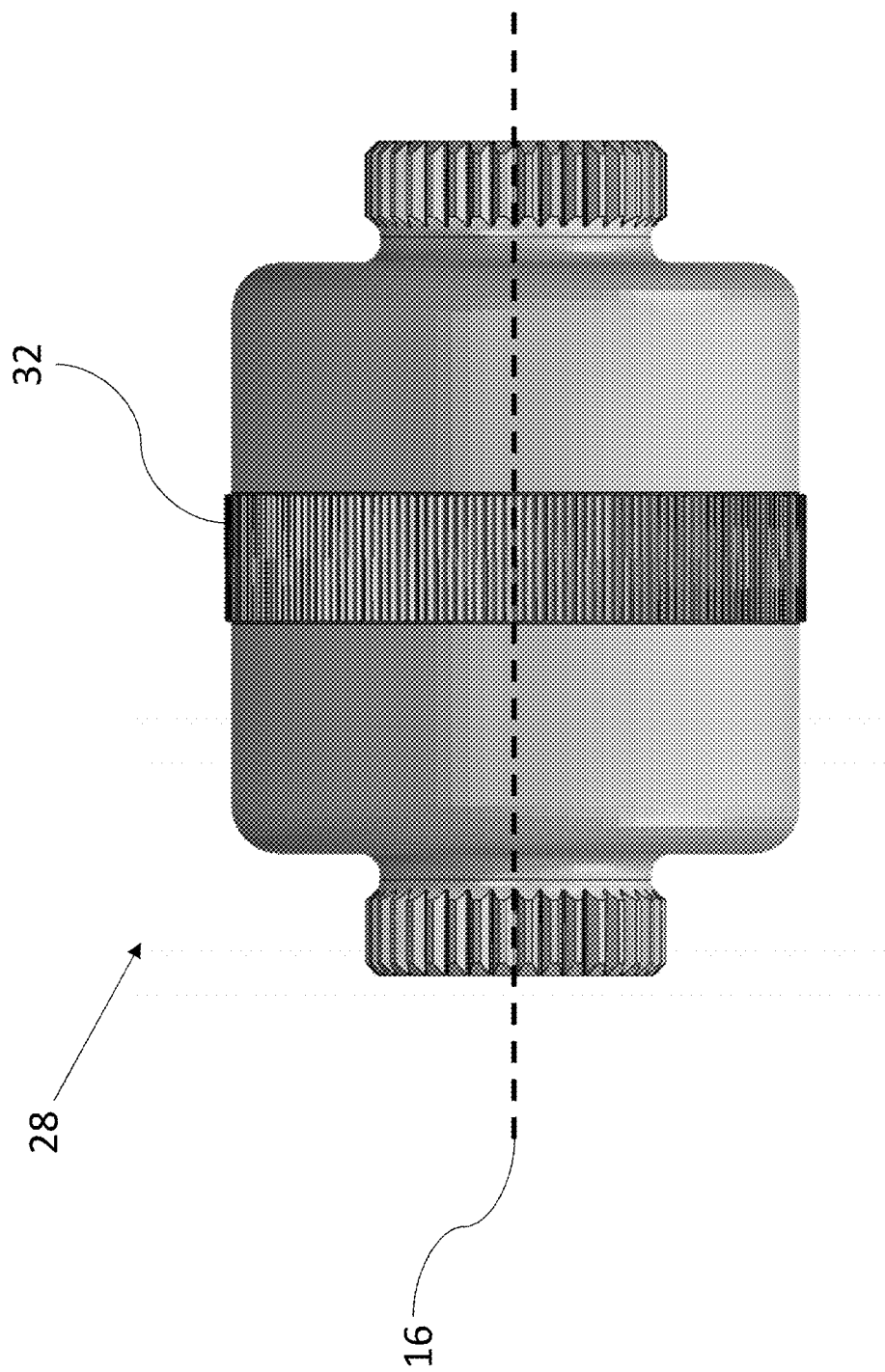

FIGS. 9 and 10 are side views of flexible splines 10 in accordance with examples of the present disclosure. FIG. 9 shows a straight flexible spline 26 and FIG. 10 shows a cupped flexible spline 28. Both figures are side views and the longitudinal axis 16 is shown as a dashed line. During use in a strain wave gear system 6, a wave generator 8 may be placed inside the flexible splines 10.

Figure 8:
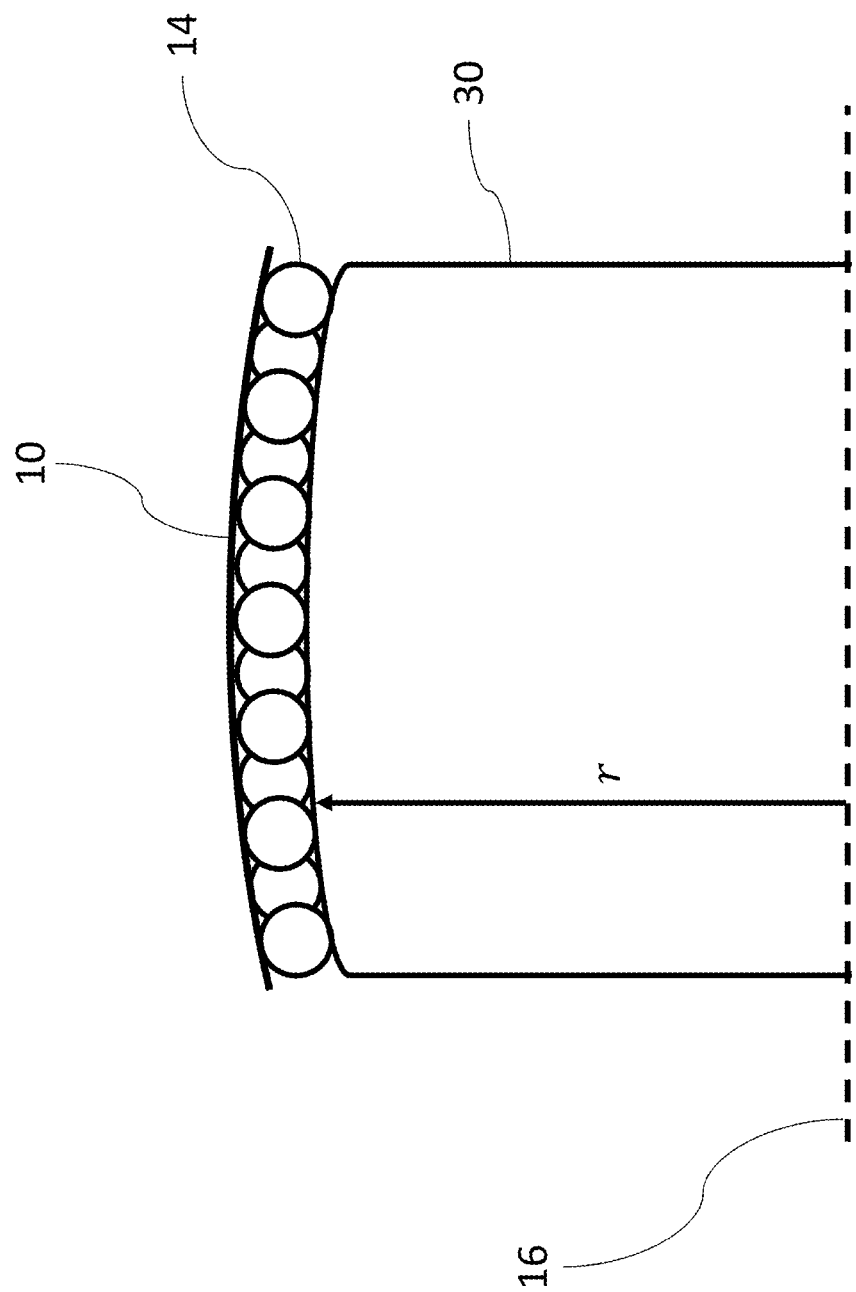
FIG. 8 shows a cross-sectional side view of a strain wave gear system in accordance with an example of the present disclosure.

The cupped flexible spline 28 shown in FIG. 10 may be particularly well-suited for use with a barrelled wave generator 30 (e.g. as shown in FIG. 8). Owing to the curved end sections, the cupped flexible spline 28 may more easily conform to the (e.g. curved) shape of the barrelled wave generator 30. That is, the cupped flexible spline 28 may bend more easily along the axial direction 16 compared to a straight flexible spline 26 (e.g. as shown in FIG. 9). Therefore, a system of a barrelled wave generator 30 and a cupped flexible spline 28 may advantageously be used in a strain wave generator 6 including a bearing arrangement 14 of the present disclosure.

The invention claimed is:

1. A strain wave gear system, comprising:
    a circular spline arranged around a longitudinal axis;
    a flexible spline within and coaxial with the circular spline;
    a wave generator within and coaxial with the flexible spline;
        wherein the wave generator is non-circular in a plane perpendicular to the longitudinal axis;

wherein the wave generator is arranged to rotate about the longitudinal axis; and wherein the flexible spline is arranged to flex in response to rotation of the wave generator, such that the flexible spline selectively engages with the circular spline; and a bearing arrangement between and coaxial with the wave generator and the flexible spline;

wherein:

the bearing arrangement comprises a plurality of bearings that are spherical and a cage arranged to retain the plurality of bearings;

the plurality of bearings are located at more than two axial positions within the cage;

the plurality of bearings are arranged in a plurality of rows that are oriented parallel to the longitudinal axis, each of the plurality of rows comprises a plurality of the bearings disposed along an axis that is parallel to the longitudinal axis; and the bearings in each of the plurality of rows are offset along the longitudinal axial from the bearings in an adjacent row.

2. The strain wave gear system as claimed in claim 1, wherein the plurality of bearings are configured to rotate around at least one axis relative to the cage.

3. The strain wave gear system as claimed in claim 1, wherein the plurality of bearings are configured to move in a radial direction relative to the cage.

4. The strain wave gear system as claimed in claim 1, wherein the wave generator is elliptical in a plane perpendicular to the longitudinal axis of the circular spline.

5. The strain wave gear system as claimed in claim 1, wherein the flexible spline is configured to deform around a perimeter of the wave generator.

6. The strain wave gear system as claimed in claim 1, wherein the radius of the wave generator varies along its axial length.

7. The strain wave gear system as claimed in claim 1, wherein the radius of the wave generator is smaller at each of the axial ends of the wave generator than at the centre of the wave generator.

8. The strain wave gear system as claimed in claim 1, wherein:

the circular spline comprises a plurality of inner teeth;

the flexible spline comprises a plurality of outer teeth; and the plurality of inner teeth of the circular spline are configured to mesh with the plurality of outer teeth of the flexible spline.

9. The strain wave gear system as claimed in claim 8, wherein the plurality of inner teeth of the circular spline are configured to mesh with the plurality of outer teeth of the flexible spline in the region of the maximum diameter of the flexible spline.

10. The strain wave gear system as claimed in claim 1, wherein the strain wave gear system is a step-down gear system.

* * * * *